US009470122B2

(12) United States Patent
Lee et al.

(10) Patent No.: US 9,470,122 B2
(45) Date of Patent: Oct. 18, 2016

(54) OIL PUMP CONTROL VALVE

(71) Applicant: UNICK CORPORATION, Busan (KR)

(72) Inventors: Chang Hoon Lee, Busan (KR); Eui Dong Roh, Busan (KR); Ji Hoon Park, Busan (KR)

(73) Assignee: UNICK CORPORATION, Busan (KR)

( * ) Notice: Subject to any disclaimer, the term of this patent is extended or adjusted under 35 U.S.C. 154(b) by 175 days.

(21) Appl. No.: 14/355,387

(22) PCT Filed: Nov. 1, 2012

(86) PCT No.: PCT/KR2012/009102
§ 371 (c)(1),
(2) Date: Apr. 30, 2014

(87) PCT Pub. No.: WO2013/066062
PCT Pub. Date: May 10, 2013

(65) Prior Publication Data
US 2014/0311440 A1   Oct. 23, 2014

(30) Foreign Application Priority Data
Nov. 1, 2011   (KR) ........................ 10-2011-0112718

(51) Int. Cl.
*F01M 1/16*   (2006.01)
*F01M 1/20*   (2006.01)
(Continued)

(52) U.S. Cl.
CPC ................. *F01M 1/16* (2013.01); *F01M 1/02* (2013.01); *F01M 1/20* (2013.01); *F16K 31/0665* (2013.01)

(58) Field of Classification Search
CPC .. F01M 1/16; F01M 1/02; F01M 2001/0246; F01M 11/03; F01M 2001/0238; F01M 11/0004; F01M 11/04; F01M 11/0408; F01M 11/0458; F01M 1/08; F01M 1/18; F01M 1/20; F01M 2001/0223; F01M 2001/083; F01M 2001/1071; F01M 2001/123; F01M 2011/0083; F01M 2011/0483; F16K 17/00; F16K 27/029; F16K 31/0631
USPC ........................................ 123/196 R, 196 CP
See application file for complete search history.

(56) References Cited

U.S. PATENT DOCUMENTS 4,596,273 A * 6/1986 Kiyoshima ......... F16K 31/0631
137/625.5
5,050,642 A * 9/1991 Bright ................. F16K 31/0631
137/625.65

(Continued)

FOREIGN PATENT DOCUMENTS

CN   101178064 A   5/2008
CN   101203662 A   6/2008

(Continued)

OTHER PUBLICATIONS

Chinese Office Action dated Sep. 8, 2015, for corresponding Chinese Application No. 201280053753.8.

(Continued)

*Primary Examiner* — Marguerite McMahon
*Assistant Examiner* — Tea Holbrook
(74) *Attorney, Agent, or Firm* — Kinney & Lange, P.A.

(57) ABSTRACT

An oil pump control valve assembly includes a control valve for controlling a flow of a fluid, and a solenoid for operating the control valve. The control valve includes a tube-like holder having a hollow internal space, configured to include an inflow port formed at one end thereof, a tube-like first valve sheet formed in the middle of the holder, a ball valve mounted in the first valve sheet, a second valve sheet coupled to a second end of the first valve sheet, and a load mounted in the second valve sheet, one end thereof being extended through the second valve sheet to come into contact with the ball valve, wherein, when the solenoid is operated, the ball valve is moved to open the inflow port.

9 Claims, 5 Drawing Sheets

(51) Int. Cl.
*F01M 1/02* (2006.01)
*F16K 31/06* (2006.01)

(56) References Cited

U.S. PATENT DOCUMENTS

| | | | | |
|---|---|---|---|---|
| 5,135,027 | A * | 8/1992 | Miki | F16K 31/0631 137/596.17 |
| 5,718,264 | A * | 2/1998 | Sturman | F15B 13/0405 137/625.65 |
| 5,845,667 | A * | 12/1998 | Najmolhoda | F16K 31/0631 137/1 |
| 6,065,495 | A * | 5/2000 | Fong | F15B 13/0405 137/625.25 |
| 6,084,493 | A * | 7/2000 | Siegel | B60T 8/363 251/129.15 |
| 6,659,421 | B1 * | 12/2003 | Goossens | B60T 8/363 251/129.02 |
| 6,957,656 | B2 * | 10/2005 | Tochiyama | F16K 31/0665 137/14 |
| 2002/0113677 | A1 * | 8/2002 | Holmes | F16K 31/0631 335/256 |
| 2004/0011981 | A1 * | 1/2004 | Ahn | B60T 8/363 251/129.14 |
| 2005/0285065 | A1 | 12/2005 | Uryu et al. | |
| 2010/0314567 | A1 * | 12/2010 | Uechi | B60T 8/36 251/129.15 |

FOREIGN PATENT DOCUMENTS

| | | |
|---|---|---|
| CN | 201078249 Y | 6/2008 |
| DE | 4431457 A1 | 3/1996 |
| JP | 11-280935 A | 10/1999 |
| JP | H11280935 A | 10/1999 |
| JP | 2004324740 A | 11/2004 |
| JP | 2009085321 A | 4/2009 |
| JP | 2011122651 A | 6/2011 |
| KR | 10-2004-0092363 A | 11/2004 |
| KR | 20040092363 A | 11/2004 |
| KR | 10-0567737 B1 | 4/2006 |
| KR | 10-2011-0056811 A | 5/2011 |

OTHER PUBLICATIONS

Japanese Office Action dated Sep. 8, 2015, for corresponding Japanese Application No. 2014-539871.
International Search Report dated Feb. 5, 2013, for PCT/KR2012/009102.
European Search Report dated Mar. 4, 2015, for corresponding European Patent Application No. 12845170.
First Japanese Office Action dated Jun. 21, 2016, for corresponding Japanese Application No. 2014-539871.

* cited by examiner

OIL PUMP CONTROL VALVE

BACKGROUND

The present invention relates to an oil pump control valve, and more particularly, to an oil pump control valve capable of constantly maintaining the pressure of oil that is pumped from an oil pump and is ejected into an engine.

The engine of a vehicle is designed to circulate oil for lubrication and cooling of various components mounted therein. This engine includes an oil pump for circulating oil, and a relief valve for preventing a pressure of oil pumped by the oil pump to be excessively increased.

An oil pump will be described with reference to a prior art (Korean Patent Publication No. 2011-0056811. As shown in FIG. 5, an oil pump 1 includes a housing 10 in which a transport path 12 is formed, and a relief valve 20 mounted on the transport path 12. With this structure, oil is supplied from a lower end of the housing 10 and transported through the transport path 12. In this transport path, the oil is compressed to a predetermined pressure. Then, the oil is ejected through a side of the housing 10. At this time, the relief valve 20 mounted on the transport path 12 serves to discharge some of the oil to be ejected when the pressure of the ejected oil is excessively increased. Specifically, when the pressure of the ejected oil is equal to or higher than a predetermined level, the relief valve 20 is operated to open a drain port 22, thereby discharging some of the oil.

However, since the oil pump 1 having the aforementioned structure is operated by the action of a camshaft, an increase in the rpm (revolutions per minute) of the engine brings about a rise in the pressure of the oil ejected by the oil pump 1. This rise in the pressure of the oil acts as a disturbance in the constant pressure of the oil circulated in the engine, thereby making it difficult to facilitate smooth lubrication and cooling of various components such as a cylinder head or a cylinder block. Particularly, excessive pressure is applied to the components, thereby deteriorating durability thereof significantly.

In view of the above, the present invention provides an oil pump control valve capable of constantly maintaining the pressure of oil that is pumped from an oil pump and is ejected into an engine.

SUMMARY

In accordance with an aspect of the present invention, there is provided an oil pump control valve assembly including a control valve for controlling a flow of a fluid, and a solenoid for operating the control valve.

The control valve may include: a tube-like holder having a hollow internal space, configured to include an inflow port formed at one end thereof and a control port formed at a middle thereof, the inflow port and the control port being connected to each other in the hollow internal space; a tube-like first valve sheet formed in the middle of the holder, configured to include an inflow hole connected to the inflow port, which is formed at a first end of the first valve sheet, and a discharge hole connected to the control port, which is formed at a middle of the first valve sheet; a ball valve mounted in the first valve sheet to open or close the inflow hole; a second valve sheet coupled to a second end of the first valve sheet, which is opened; and a load mounted in the second valve sheet, one end thereof being extended through the second valve sheet to come into contact with the ball valve, wherein, when the solenoid is operated, the ball valve is moved to open the inflow port.

Further, the solenoid coupled to the other end of the holder may include: a bobbin having an external circumferential surface around which a coil is wound; a yoke mounted in one end of the bobbin; a core mounted in the other end of the bobbin, a part of the core being inserted into the bobbin; a plunger mounted in the bobbin, the other end of the load being coupled to the plunger; and a spring mounted between the plunger and the core to elastically support the plunger.

With the above structure, when no electric power is applied to the solenoid, the plunger and the load are upwardly moved by the spring mounted in the solenoid to adhere the ball valve into the inflow hole. As a result, the connection between the inflow port and the control port is blocked, and thus the oil supplied through the inflow port is not discharged through the control port.

In contrast, when an electric power is applied to the solenoid, the plunger and the load are downwardly moved to disconnect the ball valve from the inflow port. As a result, the inflow port and the control port are connected to each other, and thus the oil supplied through the inflow port is controlled to have a predetermined pressure to be discharged through the control port.

In accordance with the aspect of the present invention, as the solenoid is operated according to whether an electric power is applied to the solenoid to vertically move the load, the oil supplied through the inflow port is controlled to have a predetermined pressure to be discharged through the control port, thereby increasing the rpm of an engine. As a result, even when the oil is supplied from an oil pump in an excessive pressure level, it is possible to constantly the pressure of the oil ejected into the engine. Accordingly, it is possible to facilitate smooth lubrication and cooling of various components, such as a cylinder head or a cylinder block, of the engine. Further, it is possible to prevent durability of the components from deteriorated due to excessive pressure.

DETAILED DESCRIPTION

Figure 1:
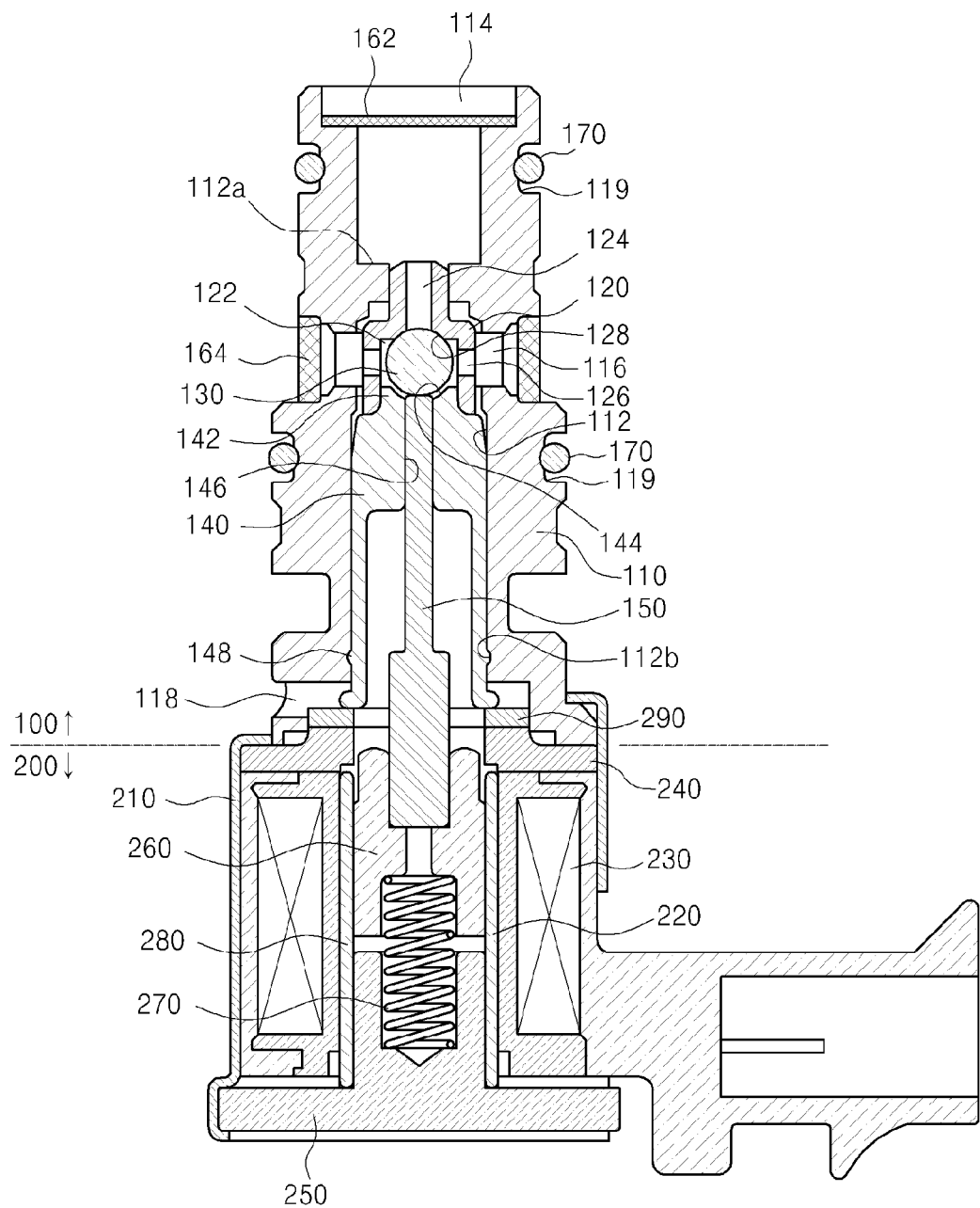
FIG. 1 is a cross-sectional view showing an oil pump control valve in accordance with an exemplary embodiment of the present invention.
Figure 2:
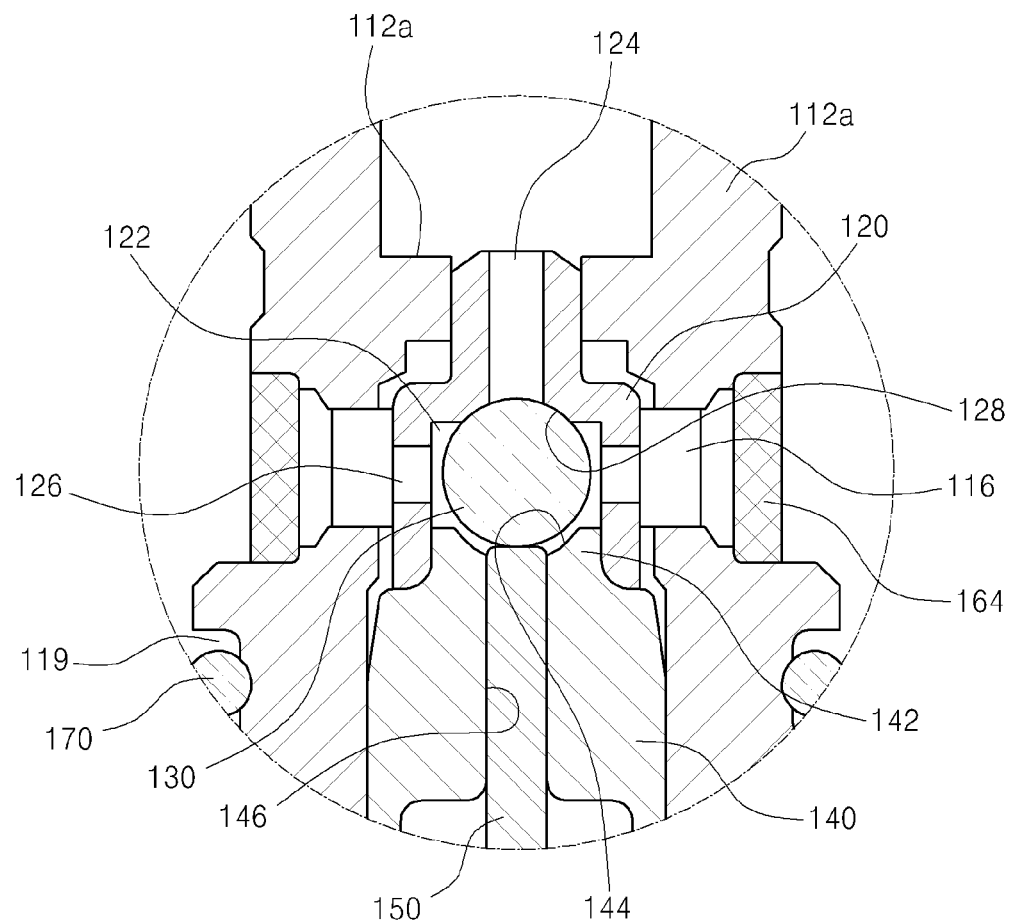
FIG. 2 is an enlarged view showing a part of FIG. 1.

Embodiments of the present invention will now be described with reference to the accompanying drawings which form a part hereof. Further, in the following description and drawings, components having substantially the same configuration and function are denoted by as like reference characters as possible even in different figures.

As shown in FIG. 1, an oil pump control valve assembly in accordance with an exemplary embodiment of the present invention includes a control valve 100 for controlling a flow (inflow or outflow) of oil, and a solenoid 200 for operating the valve 100.

The valve 100 is mounted in an oil pump 1 (FIG. 5) of a housing 10 (FIG. 5) to apply a predetermined control pressure to oil supplied from the oil pump 1 such that the oil has a constant pressure and is discharged to a cylinder head (not shown) or a cylinder block (not shown).

The valve 100 includes a holder 110; a first valve sheet 120 mounted in the holder 110; a ball valve 130 mounted in the first valve sheet 120; a second valve sheet 140 mounted below the first valve sheet 120; and a load 150 mounted in the second valve sheet 140.

The holder 110 is of a pipe-like shape having a predetermined length, with an internal space 112. An inflow port 114 is formed on a surface of a top end of the holder 110, a control port 116 is formed on an external circumferential surface of a middle thereof, and a drain port 118 is formed on an external circumferential surface of a bottom end thereof. Further, an annular mounting groove 119 is formed on an external circumferential surface of the top end of the holder 110 and the external circumferential surface of the middle end thereof.

The internal space 112 in which the first valve sheet 120 and the second valve sheet 140 are to be mounted is formed to extend in a longitudinal direction of the holder 110. A top end of the internal space 112 is connected to the inflow port 114, a fixing protrusion 112a to which the first valve sheet 120 is fixed is formed on an inner wall of the middle of the holder 110, and a fixing groove 112b to which the second valve sheet 140 is fixed is formed on an inner wall of the bottom end of the holder 110.

The inflow port 114 is a part through which the oil supplied from the oil tank (not shown) flows, and is formed on the surface of the top end of the holder 110 to be connected to the internal space 112. The control port is a part through which the oil controlled to have a predetermined pressure is discharged, and includes a plurality of control ports that are radially formed on the external circumferential surface of the middle of the holder 110, to be connected to the internal space 112. The drain port 118 serves to facilitate the inflow of the oil into the second valve sheet 140 and the solenoid 200 or the outflow of the oil to the outside thereof in order to remove the remaining pressure inside the valve 100 when the load is moved. To that end, a flow hole 149 through which the oil flows is formed at the circumference of a lower end of the second valve sheet 140.

In the meantime, a first filter 162 and a second filter 164 are respectively mounted on the surface of the top end of the holder 110 on which the inflow port is formed and the external circumferential surface of the middle of the holder 110 on which the control port 116 is formed. These filters 162 and 164 serve to remove foreign materials included in the oil flowing through the inflow 114 and the control port 116. The first filter 162 is formed of a flat plate that can be attached on the surface of the top end of the holder 110, and the second filter 164 is formed of an annular member in such a way so as to surround an external circumferential surface of the holder 110.

Figure 5:
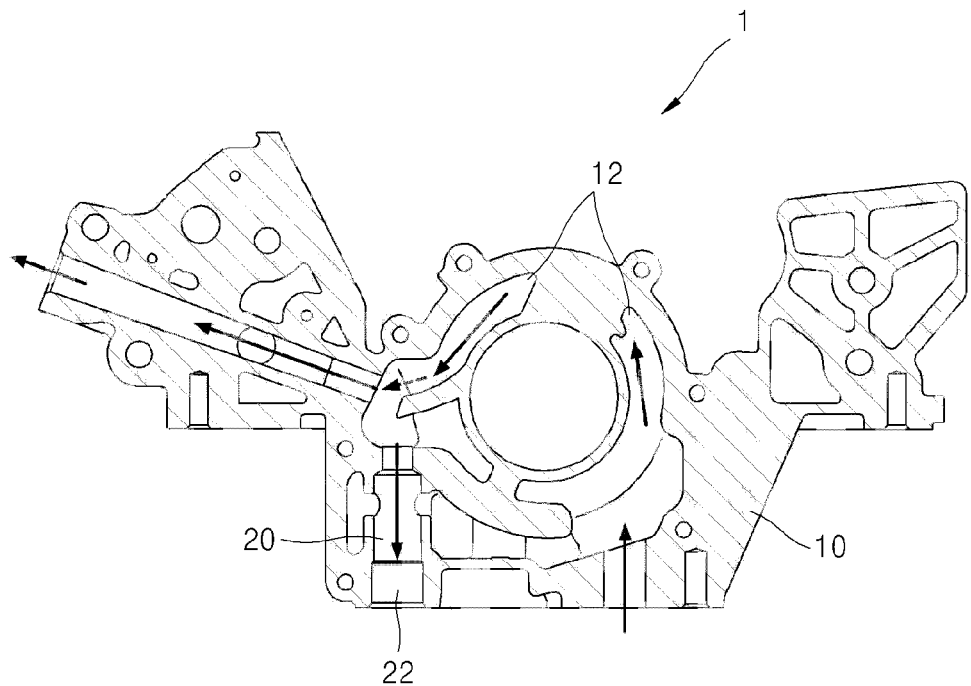
FIG. 5 is a cross-sectional view showing a conventional oil pump for a vehicle.

The mounting groove 119 is formed on the external circumferential surface of the holder 110, with an annular shape having a quadrilateral cross section. The mounting groove 119 is formed at the top end and the middle of holder 110 as described above. An O-ring 170 having an annular shape is mounted in the mounting groove 119 to serve to prevent the oil from leaking into a gap between the oil pump control valve and the oil pump housing 10 (FIG. 5). Specifically, under a state where the oil pump control valve is installed, the O-ring 170 is adhered to a mounting hole (not shown) of the oil pump housing 10 (FIG. 5) to prevent the oil flowing through the inflow port 114 and the control port 116 from leaking into the gap between the oil pump control valve and the oil pump housing 10 (FIG. 5). Particularly, the O-ring 170 may additionally prevent abnormal flow of the oil, for example, prevent some of the oil flowing into the inflow port 114 from flowing into the control port 116 or some of the oil flowing into the control port 116 from flowing into the inflow port 114.

The first sheet 120 is of a multi-stage tubular shape having a small diameter portion and a large diameter portion. An operation space in which the ball valve 130 is mounted is formed in the first valve sheet 120. Further, an inflow hole 124 connected to the inflow port 114 is formed at the small diameter portion of the first valve sheet 120 to extend therethrough, and a discharge hole 126 connected to the control port 116 is formed on an external circumferential surface of the large portion thereof. At this time, a first accommodating groove 128 for accommodating the ball valve 130 is formed at a circumference of a lower end of the inflow hole 124 connected to the operation space 122. Further, an O-ring 129 is mounted between a lower end of the fixing protrusion 112a of the holder 110 and an upper end of the first valve sheet 120 to prevent the oil that is discharged through the discharge hole 126 from being discharged through the inflow port 114.

The ball valve 130 serves to make a connection between the inflow port 114 and the control port 116 or release the connection therebetween by opening or closing the inflow hole 124 formed in the first valve sheet 120

This ball valve 130 is formed to have a completely globular shape. The ball valve 130 is upwardly moved to be inserted into the first accommodating groove 128, thereby closing the inflow hole 124, and is downwardly moved to be inserted into a second accommodating groove 144 to be described later, thereby opening the inflow hole 124.

The second valve sheet 140 is of a tubular shape having a predetermined length, with an upper portion that is closed and sealed. A protrusion 142 that is to be inserted into an opened lower end of the first valve sheet 120 is formed on an upper surface of the second valve sheet 140, and the second accommodating groove 144 in which the ball valve 130 is accommodated is formed on a surface of an upper end thereof. Further, a through hole 146 through which the load 150 is extended is formed at a sealed center of the upper end of the second valve sheet 140, a fixing hole 148 that is to be inserted into the fixing groove 112b of the holder 110 is protruded on an external circumferential surface of a lower end thereof, and the flow hole 149 through which the oil flows is formed at a circumference of the lower end of the second valve sheet 140, i.e., a lower portion of the fixing hole 148.

The load 150 is formed to have a multi-stage shape in which an upper diameter is smaller than a lower diameter. An upper portion of the load 150 having the smaller diameter is extended through the second valve sheet 140 and the first valve sheet 120 to come into contact with the ball valve 130. This load 150 serves to open or close the inflow port 124 by moving the ball valve 130 when the solenoid 200 is operated.

The solenoid 200 includes a case 210; a bobbin 220 mounted in the case 210; a coil 230 wound around an external circumferential surface of the bobbin 220; a yoke 240 coupled to an upper portion of the bobbin 220; a core 250 coupled to a lower portion of the bobbin 220; a plunger 260 mounted to be vertically moved in the yoke 240 and the core 250; and a spring 270 mounted between the core 250 and the plunger 260.

The case 210 is formed to have a cylindrical shape having an upper end and a lower end, both of which are opened, and the bobbin 220, the coil 230, the yoke 240, the core 250, the plunger 260, and the spring 270 are mounted in the case 210.

In this case, as shown in FIG. 1, the upper side and the lower end are caulked to surround the lower end of the holder 110 and the lower end of the core. This is to integrally form the valve 100 and the solenoid 200 and simultaneously prevent the movement of the components 220 to 270 mounted in the case 210.

The bobbin 220 is formed to have a hollow spool shape in such a way so as to insert parts of the yoke 240 and the core 250 through the upper end and the lower end thereof and wind the coil 230 by which a magnetic field is generated when an electric power is applied thereto. This bobbin 220 serves as an insulator to prevent electrical connection between the coil 230 and the yoke 240 and between the coil 230 and the core 250.

The yoke 240 and the core 250 serve as fixed iron cores for moving the plunger 260 serving as a movable iron core when the electric power is applied thereto. In this case, the yoke 240 is formed to have a flat plate, and the core 250 is formed to have a multi-stage shape to be inserted into a guide 280. This is to enable the magnetic field generated in the coil 230 to focus on the core 250 rather than the yoke 240. In other words, this is to make it easy to move the plunger 260 serving as the movable iron core toward the core 250 when the electric power is applied thereto. Further, as the yoke 240 is formed of the flat shape, it is possible to make it easy to form it with a reduced cost.

The plunger 260 serves as a metal bar that is vertically moved in the bobbin 220 by the magnetic field generated in the coil 230. At this time, the load 150 is coupled to the plunger 260 in such a way so as to insert a part of the lower portion of the load thereinto. As a result, when the plunger 260 is moved, the load is also moved along therewith.

The spring 270 is a typical coil spring to elastically support the plunger 260 in an upper direction. As a result, in a normal state in which no electric power is applied to the solenoid 200, the plunger 260 and the load 150 are elastically upwardly supported by the spring 270, thereby moving the ball valve 230 upwardly. Accordingly, the inflow hole 124 is closed.

The guide 280 is additionally provided between the bobbin 220, the core 250, and the plunger 260. This guide 280 serves to guide the movement of the plunger 260 and simultaneously prevent deformation of the solenoid 200.

An operating process of the oil pump control valve assembly in accordance with the embodiment of the present invention will be described as follows with reference to FIG. 3 and FIG. 4.

Figure 3:
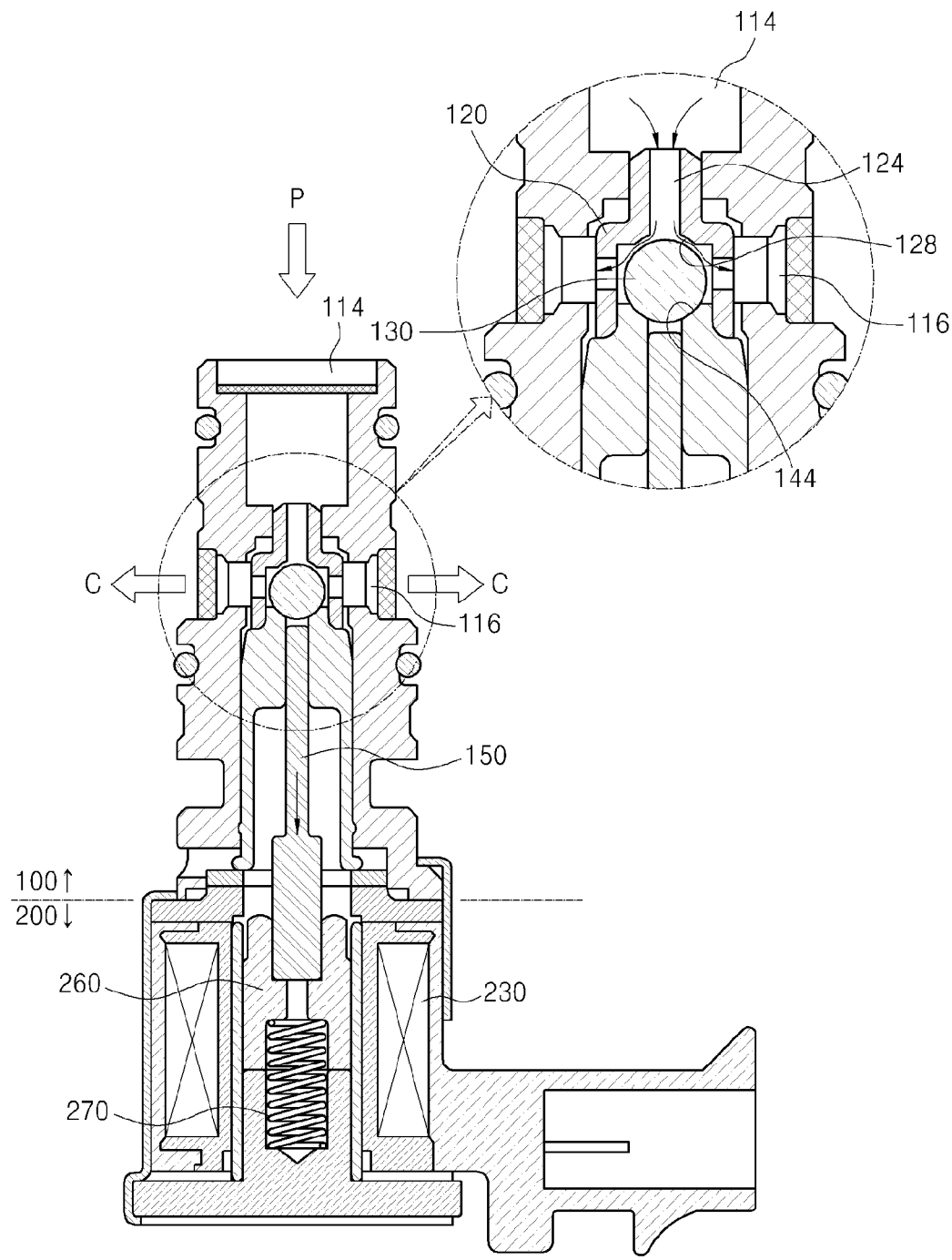
FIG. 3 to FIG. 4 show an operation state of the oil pump control valve in accordance with the present exemplary embodiment.
Figure 4:
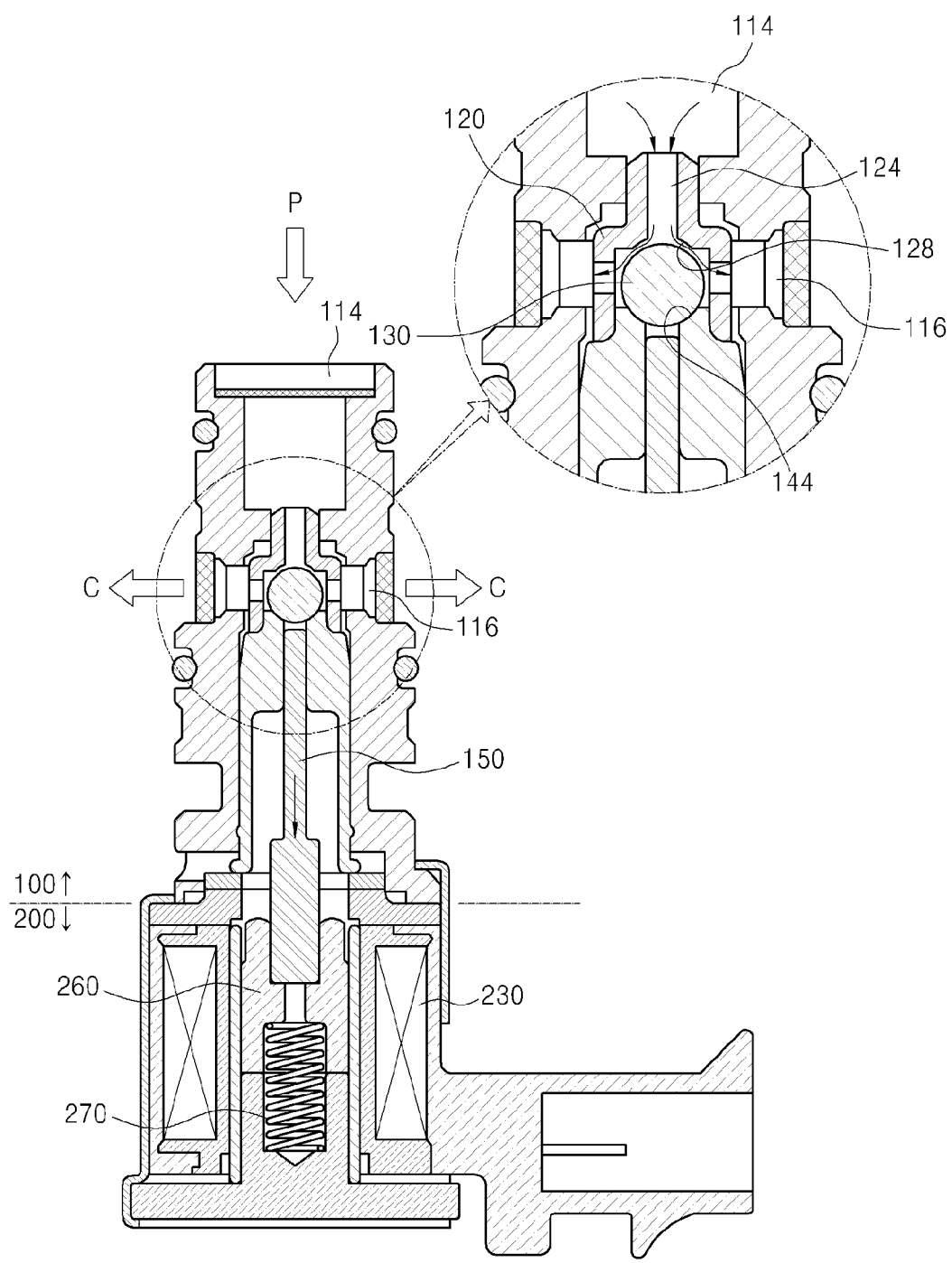

FIG. 3 shows a state of the oil pump control valve assembly to which no power is supplied. As such, in the state in which no electric power is applied to the solenoid 200, the plunger 260 and the load 250 are elastically upwardly supported by the spring 270. As a result, the ball valve 130 is adhered to the first accommodating groove 128 by the load 150, thereby closing the inflow hole 125. In this case, the connection between the inflow port 114 and the control port 116 is blocked. Accordingly, even when oil P is supplied through the inflow port 114, the oil P is not discharged through the control port 116.

In contrast, when an electric power is applied to the solenoid 200 in the aforementioned state, a magnetic field is generated by the coil 230, and the plunger 260 is moved by the generated magnetic field, thereby downwardly moving the load 150. As a result, the ball valve 130 that has been adhered to the first accommodating groove 128 is disconnected therefrom to be accommodated in the second accommodating groove 144, thereby opening the inflow hole 124. Accordingly, the inflow port 114 and the control port 116 are connected to each other. Thus, while the oil P supplied through the inflow port 114 passes through the first valve sheet 120, the oil P is controlled to have a predetermined pressure. Then, the controlled oil C is discharged through the control port 116 (see FIG. 4).

When the application of the electric power to the solenoid 200 is stopped, the plunger 260 and the load 150 are upwardly moved by the spring 270 mounted in the solenoid 200 to adhere the ball valve 130 into the first accommodating groove 128, thereby closing the inflow port 124. As a result, the connection between the inflow port 114 and the control port 116 is blocked. Accordingly, even when the oil P is supplied, the oil P is not discharged through the control port 116 (see FIG. 3).

While the exemplary embodiments of the invention have been described above, the embodiments are only examples of the invention, and it will be understood by those skilled in the art that the invention can be modified in various forms without departing from the technical spirit of the invention. Therefore, the scope of the invention should be determined on the basis of the descriptions in the appended claims, not any specific embodiment, and all equivalents thereof should belong to the scope of the invention.

The invention claimed is:

1. An oil pump control valve assembly including a control valve for controlling a flow of a fluid, and a solenoid for operating the control valve, the control valve comprising:
   a tube-like holder having a hollow internal space, configured to include an inflow port formed at one end thereof and a control port formed at a middle end thereof, the inflow port and the control port being connected to each other in the hollow internal space;
   a tube-like first valve sheet formed in the middle of the holder, configured to include an inflow hole connected to the inflow port, which is formed at a first end of the first valve sheet, and a discharge hole connected to the control port, which is formed at a middle end of the first valve sheet;
   a ball valve mounted in the first valve sheet to open or close the inflow hole;
   a second valve sheet coupled to a second end of the first valve sheet, which is opened; and
   a load mounted in the second valve sheet, one end thereof being extended through the second valve sheet to come into contact with the ball valve,
   wherein, when the solenoid is operated, the ball valve is moved to open the inflow port;
   wherein the solenoid comprises:
      a bobbin having an external circumferential surface around which a coil is wound;
      a yoke mounted in one end of the bobbin;
      a core mounted in the other end of the bobbin, a part of the core being inserted into the bobbin;
      a plunger mounted in the bobbin, the other end of the load being coupled to the plunger; and
      a spring mounted between the plunger and the core to elastically support the plunger,
   wherein the solenoid is coupled to the other end of the holder; and
   wherein the oil pump control valve assembly further comprises a guide mounted between the bobbin and the plunger, in contact with the plunger, to guide movement of the plunger.

2. The oil pump control valve assembly of claim 1, wherein the first valve sheet is of a multi-stage tubular shape having a small diameter portion and a large diameter portion, the inflow port is formed at the small diameter portion, and the discharge hole is formed at the large diameter portion.

3. The oil pump control valve assembly of claim 1, wherein a first accommodating groove in which the ball valve is to be accommodated is formed in the inflow hole.

4. The oil pump control valve assembly of claim 1, wherein a protrusion which is to be inserted into the opened second end of the first valve sheet is formed at one end of the second valve sheet, and a second accommodating groove in which the ball valve is to be accommodated is formed in the protrusion.

5. The oil pump control valve assembly of claim 1, wherein the inflow port is formed on a surface of one end of the holder, the control port is formed on external circumferential surface of a middle of the holder, and a filter is formed in the inflow port and the control port.

6. The oil pump control valve assembly of claim 1, wherein the control port includes a plurality of control ports that are radially disposed on an external circumferential surface of a middle of the holder, an annular filter is formed on the external circumferential surface of the middle of the holder.

7. The oil pump control valve assembly of claim 1, wherein an annular mounting groove is formed on a circumferential surface of the holder, and an O-ring is formed in the mounting groove.

8. The oil pump control valve assembly of claim 7, wherein the mounting groove and the O-ring are provided between one end of the holder and the control port, and between the control port and the other end of the holder.

9. The oil pump control valve assembly of claim 1, wherein a drain port is formed in the other end of the holder.

* * * * *